United States Patent [19]

Jaquay

[11] 3,714,561

[45] Jan. 30, 1973

[54] TRANSDUCER FOR MEASURING THE DISPLACEMENT OF AN ELECTRICALLY CONDUCTIVE OBJECTIVE

[75] Inventor: Paul T. Jaquay, Kettering, Ohio

[73] Assignee: The United States of America as represented by the Secretary of the Air Force

[22] Filed: Nov. 24, 1970

[21] Appl. No.: 92,467

[52] U.S. Cl. ................................................324/61 P
[51] Int. Cl. ............................................G01r 27/26
[58] Field of Search ........324/61, 61 P, 61 S; 73/71.4

[56] References Cited

UNITED STATES PATENTS

| 3,096,478 | 7/1963 | Brown | 324/61 P |
| 3,221,248 | 11/1965 | Batteau et al. | 324/61 P |
| 3,089,332 | 5/1963 | Comstock, Jr. | 73/71.4 |
| 3,319,163 | 5/1967 | Thompson | 324/61 |
| 3,515,987 | 6/1970 | Zubrick et al. | 324/61 |

FOREIGN PATENTS OR APPLICATIONS

| 985,428 | 3/1965 | Great Britain | 324/61 P |

*Primary Examiner*—Alfred E. Smith
*Attorney*—Harry A. Herbert, Jr. and Cedric H. Kuhn

[57] ABSTRACT

A motion detection transducer comprises a sensing element and an excitation-shield element, both elements being formed of a conductive metal. The sensing element, whose front surface is usually flat, is partially or completely surrounded by and spaced apart from the excitation-shield element. The front surfaces of both elements are in the same geometric plane. The sensing element is connected directly to a charge amplifier by means of a coaxial cable while the excitation-shield element is connected to a source of constant, direct current voltage. The transducer is particularly useful in measuring the relative motion of electrically conductive surfaces or objects.

3 Claims, 6 Drawing Figures

PATENTED JAN 30 1973

INVENTOR.
PAUL T. JaQUAY
BY Harry A. Herbert Jr
Cedric H. Kuhn
ATTORNEYS

INVENTOR.
PAUL T. JaQUAY
BY Harry A. Herbert Jr
and
Cedric H. Kuhn
ATTORNEYS

TRANSDUCER FOR MEASURING THE DISPLACEMENT OF AN ELECTRICALLY CONDUCTIVE OBJECTIVE

FIELD OF THE INVENTION

This invention relates to a transducer for measuring the relative motion of electrically conductive surfaces or objects. In one aspect it relates to a method for measuring the displacement of electrically conductive surfaces or objects.

BACKGROUND OF THE INVENTION

In the sonic fatigue testing of flight vehicle structures and equipment, one of the basic requirements is the accurate measurement of the displacement of test specimens. Various approaches have been taken to measure displacement. According to one approach, an accelerometer is attached to the specimen and a recording is made of its output. Displacement data are then obtained by integrating twice the recorded accelerometer output. Some of the disadvantages of this method are that attachment of the accelerometer to the specimen causes loading of the specimen and can change its response, the accelerometer output must be processed before the displacement data are available, and an additional error is introduced when the output is processed.

Another approach involves a displacement measuring system which utilizes a non-contacting electromagnetic sensor element. Such systems are expensive, complicated and basically single sensor devices. The sensor, which must be excited by a carrier signal, is sensitive to frequency drift of the excitation generator and to cable capacitance. Because of its sensitivity to cable capacitance, this type of instrument is supplied with a fixed length of cable. If an additional length of cable is required, some type of line compensator must be used for the added length. The sensitivity of the system to carrier frequency variations requires that good frequency stability must be designed into the carrier generator. Still another disadvantage of electromagnetic type sensors is that their calibration is a function of the composition of the test specimen. Furthermore, electromagnetic sensors are not readily adaptable for use in a multiple sensor system whereby several test specimens can be monitored sequentially or in parallel. Since many test requirements call for a multiple sensor system, this limitation on the use of electromagnetic sensors is another of their disadvantages.

It is an object of this invention, therefore, to provide a motion detection transducer, utilizing a non-contacting capacitance type sensor system, which is not subject to the limitations of the prior art displacement measuring systems.

Another object of the invention is to provide a method for measuring the displacement of an electrically conductive surface whereby the sensing element is indirectly excited by inducing a charge on the moving surface.

A further object of the invention is to provide a motion detection system which is adapted to include a plurality of sensors that can be monitored sequentially or in parallel.

Other objects and advantages of the invention will be coming apparent to those skilled in the art upon consideration of the accompanying disclosure and the drawing in which.

SUMMARY OF THE INVENTION

Broadly speaking, the present invention resides in a transducer for measuring the displacement of an electrically conductive object which comprises a sensing element formed of a conductive material and having a front surface shaped so that it can be positioned parallel to a surface of the electrically conductive object; a shield element formed of a conductive material and positioned so as to be spaced apart from and so as to at least partially surround the sensing element, the shield element having a front surface which lies in the same geometric plane as the front surface of the sensing element; and a source of constant, direct current voltage connected to the shield element. In a more specific embodiment of the invention, the sensing element is connected to a charge amplifier by a coaxial cable, the shield of which is grounded.

In another embodiment, the invention resides in a method for measuring the relative motion of an electrically conductive surface which comprises the steps of positioning a sensing element formed of an electrically conductive material so that its front surface is parallel to and in proximity to the electrically conductive surface; indirectly inducing a charge on the electrically conductive surface from a constant direct current voltage source; and measuring in terms of voltage the capacitance of the sensing element and the electrically conductive surface.

Figure 1:
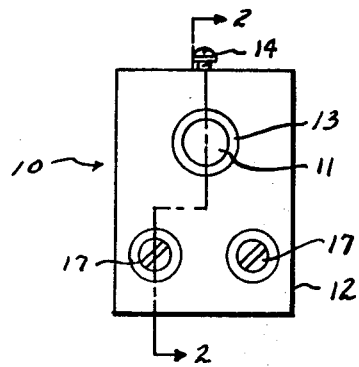
FIG. 1 is an elevational end view of the transducer of this invention.

Reference is now made to the drawing in which identical reference numerals have been used to designate the same or similar elements. In FIG. 1, there is shown the front end of a motion detection transducer 10 according to the invention. As seen in this view, sensing element 11 is positioned in an opening in excitation-shield element 12 and is spaced apart or separated from that element by air space 13. The sensing and shield elements, both shown as being in the form of plates, can be fabricated from any conductive material, such as aluminum, copper, bronze, steel, graphite and the like. Screw 14 provides means for connecting a source of constant direct current voltage, such as a battery or voltage generator, to shield element 12.

Figure 2:
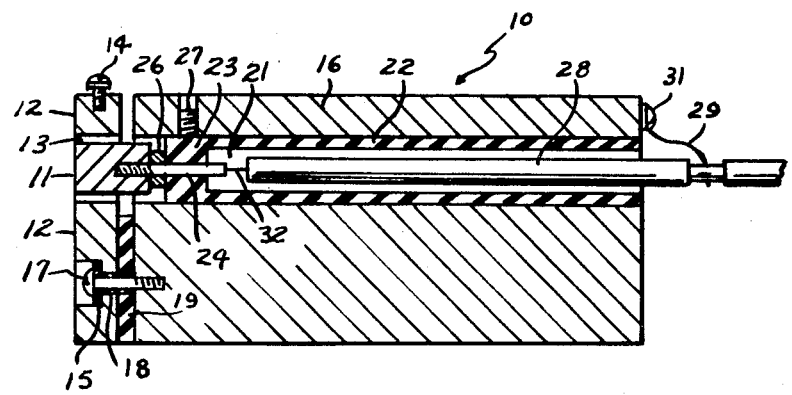
FIG. 2 is a partial cross sectional view of the sensor taken along line 2—2 of FIG. 1.

A better understanding of the structure of the transducer can be obtained by referring also to FIG. 2. Thus, it is seen that shield element 12 is affixed to elongated body member 16 by means of bolts 17 which are threaded into the body. The body is in the form of a block and can be fabricated from any suitable metal, such as aluminum or copper. The bolts are countersunk in the face or front surface of the shield element and are each insulated from the shield by a washer 15 and a sleeve 18 which are formed of an insulating material.

The sleeve insulates each bolt from shield element 12 while passing through at least a portion of a sheet of insulation 19 which separates the shield element from the body. Any suitable insulating material, such as Bakelite phenol-formaldehyde resin, glass or a ceramic material, can be used. It is only necessary that the material selected be capable of withstanding the excitation voltage applied to the shield element.

A longitudinal opening 21, which is circular in cross section, is formed in and extends throughout the length of body 16. Positioned in the opening is a tubular insulator 22 which is closed at its front or forward end 23. An opening in the front end of insulator 22 serves as a seat for metal tube 24. The front portion of tube 24, which is provided with exterior threads, extends forward of the front end of insulator 22 while the after portion of the tube extends into the interior of the insulator. The front end of tube 24 is threaded into a central opening, provided with internal threads, in the rear end of sensing element 11. A nut 26 threaded on tube 24 firmly locks the tube and sensing element together. Insulator 22 is also held fixedly in position by means of set screw 27 which is threaded through body 16 into contact with the insulator. Because of the arrangement of apparatus as described, the sensing element is maintained in a fixed position in the opening in the shield element with its front surface in the same geometric plane as the front surface of the shield element.

A coaxial cable 28, disposed within insulator 22, has its shield grounded by lead 29 attached to the shield and to body 16 by screw 31. The inner conductor 32 of the cable extends into tube 24 and is soldered to the tube at its forward end. The opposite end of conductor 32 is attached to a charge amplifier (not shown). When the transducer is in use, its body is bolted or clamped to a holder, such as an angle iron, which is provided with metal legs or which is attached to a metal stand. Thus, the transducer can be readily positioned in proximity to the object whose relative motion is to be measured with the front surfaces of the sensing and shield elements parallel to the surface of the object.

Figure 3:
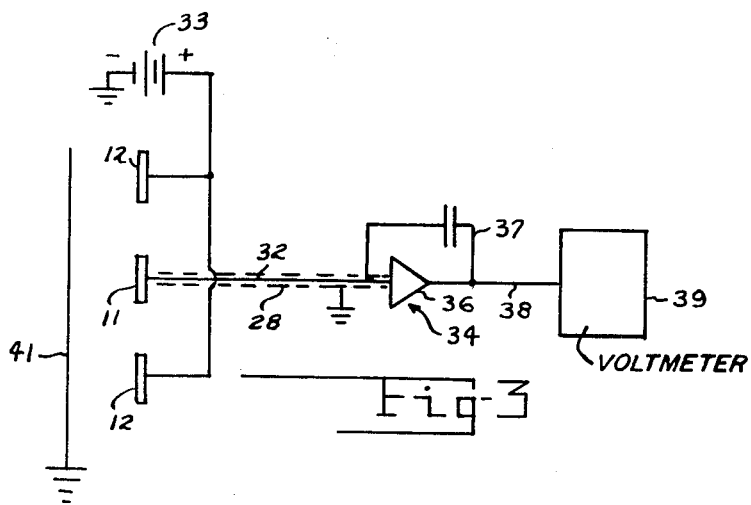
FIG. 3 is a schematic representation of the transducer and associated elements.

For an understanding of the operation of the transducer, reference is now made to FIG. 3 of the drawing. As shown in this figure, various elements described in conjunction with FIG. 1 are represented schematically. Thus, it is to be understood that shield element 12 actually surrounds sensing element 11 with an air space therebetween as shown in FIG. 1. The positive terminal of battery 33 is connected to shield element 12 while its negative terminal is grounded. The shield of coaxial cable 28 represented by a pair of broken lines is grounded. One end of conductor 32 of the cable is connected to sensing element 11 while its other end is connected to the input of charge amplifier 34. The charge amplifier, which is a commercially available item of electrical equipment, consists of a high-gain voltage amplifier 36 with a negative capacitance feedback 37. The voltage output from the charge amplifier is fed through line 38 to a device 39 for measuring and/or recording variations in voltage, such as volt meter, oscilloscope, or tape recorder. For a complete description of a charge amplifier, reference may be had to an article by Dale Pennington entitled Charge Amplifier Applications and appearing in the January 1965 issue of Instruments and Control Systems.

In a conic fatigue test, sensing element 11 and shield element 12 are positioned with their front surfaces in proximity to and parallel to the surface of panel 41. Panel 41 is formed of a conductive material, such as aluminum, and is grounded. The spacing or distance between the panel and sensing element is determined by the amplitude of the motion of the panel and the desired sensitivity. While the closer the sensing element is to the panel the greater is the sensitivity of the transducer, the element must not be placed so close that the vibrating panel will contact the element.

Since the positive terminal of battery 33 is connected to the shield element, the surface of this element is positively charged. As previously mentioned, the sensing element and the shield element are separated by air. Because of this separation, leakage currents are prevented from flowing from the shield element to the sensing element. The voltage applied to the shield element can vary within a rather wide range, e.g., from 10 to 1000 volts. However, it is usually desirable to operate at as high a voltage as the insulation material can safely withstand as the sensitivity of the transducer is greater at the higher voltages.

As a result of the shield element being positively charged, a negative charge is indirectly induced on the panel. Furthermore, the presence of the negatively charged panel opposite the sensing element causes the sensing element to be negatively charged. When the panel is at rest, the capacitance of the capacitor formed by the panel and the sensing element remains constant as a constant direct current voltage is applied to the shield. Now when the panel is subjected to high intensity sound, the panel vibrates so that the distance between the panel surface and the front surface of the sensing element changes. Furthermore, because of the vibration of the panel the capacitance of the capacitor also changes, varying inversely to the distance between the aforementioned surfaces. The changes in the capacitance of the capacitor formed by the panel surface and the sensing element causes a proportionate change in the charge which is applied to the input of charge amplifier 34 through lead 32 of the coaxial cable. As previously noted, the charge amplifier is a high-gain voltage amplifier with a negative capacitance feedback. In the operation of the charge amplifier, the output voltage that occurs as a result of the charge input signal is returned through feedback capacitor 37 to the input in an orientation which maintains the voltage at the input very close to zero. Thus, the charge input is stored in the feedback capacitor, producing a voltage across it which is equal to the value of the charge input divided by the capacitance of the feedback capacitor. This voltage across the feedback capacitor corresponds to the output voltage of the charge amplifier, and the output voltage is directly proportional to the input charge. And since the input charge is proportional to the changes in capacitance of the capacitor formed by the panel surface and the sensing element caused by the panel vibration, measurement of the output voltage of the charge amplifier provides an indication of the displacement that the panel undergoes. This measurement is readily accomplished by feeding the output from the charge amplifier to a volt meter.

Figure 5:
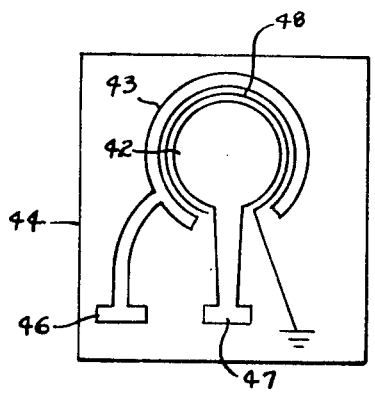
FIG. 5 is a plan view showing a modification of the sensing and shield elements.
Figure 4:
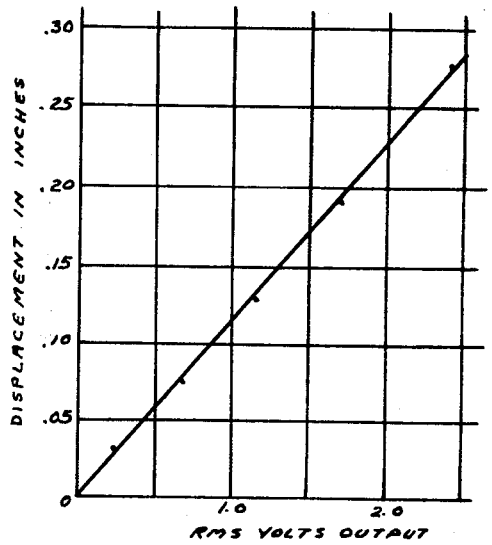
FIG. 4 is a graph obtained in calibrating the transducer.

In order to convert the voltage readings to linear measurements, it is necessary to calibrate the transducer. The initial calibration is accomplished by positioning the sensing and shield elements parallel to the surface of a shake table. The shake table is driven at preset levels of displacement, and the output voltage is recorded for each level. These two parameters are then plotted. FIG. 5 shows the calibration curve obtained from a test specimen vibrating at 20 cycles per second and with an excitation voltage of 500 volts on the shield element. For convenience the scale of a volt meter can be changed to give readings directly in inches on the basis of the calibration curve.

While the transducer has been described above with a certain degree of particularity, it is to be understood that it is not intended to limit the invention to the specific structure shown. For example, the shield element as well as the body may be cylindrical in shape without departing from the spirit and scope of the invention. Furthermore, the sensing element can assume different sizes and shapes. However, any change in the shape and/or size of the sensing element will require a separate calibration to obtain true deflection amplitudes. As an example of a sensing element and a shield element having a different configuration from those shown in FIGS. 1 and 2, reference is made to FIG. 5. As illustrated, sensing element 42 and shield element are spaced apart and are formed of a conductive material, such as copper, and are printed on a nonconductor 44, such as fiber board. The sensing element is shown as being circular in form while the shield element is arcuate in shape so as to at least partially surround the sensing element. As described previously, terminal 46 of the shield element is connected to a source of constant direct current voltage while terminal 47 of the sensing element is connected by a coaxial cable to a charge amplifier. In order to prevent leakage currents from flowing from the shield element to the sensing element, a grounded guard ring, such as conductor 48, is printed on the circuit board between the two elements.

Figure 6:
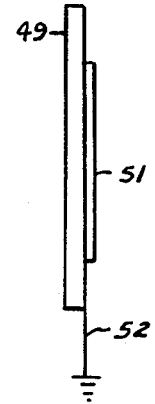
FIG. 6 is an end view of a panel of non-conductive material with a layer of a conductive material.

The operation of the transducer requires that the test specimen be a conducting material. However, a nonconducting material can be tested by applying a conducting material to the surface of the nonconductor and providing a path to ground. Thus, referring to FIG. 6, a sheet 49 of a nonconducting material, such as a Bakelite resin, has a conducting material 51, such as copper or graphite, applied to its surface. The conductor is grounded by lead 52. The sheet of nonconducting material can now be subjected to an acoustic fatigue test as described above.

The transducer of this invention possesses many advantages over those described in the literature. Thus, several of the transducers can be positioned adjacent a test specimen. By connecting the coaxial cable of each sensing element to the terminals of a multiple throw switch and by connecting the switch arm to a charge amplifier, displacement readings at different locations on the test specimen can be obtained. This procedure is made possible because the tuning and matching requirements of the prior type of instruments using electromagnetic sensor elements are unnecessary. Calibration of the transducer of this invention is readily accomplished, and there is no requirement of recalibration when switching from one transducer to another. It is also within the scope of the invention to connect the sensing elements of several transducers in parallel. For example, a cluster of closely spaced transducers can have their sensing elements connected in parallel in order to provide an additive input signal to the charge amplifier. Another advantage of the present invention accrues from the use of the transducer in combination with the charge amplifier which renders the system insensitive to cable length.

While the transducer of this invention has been described with relation to its use in measuring the displacement of vibrating object, it is not limited to this particular use. Thus, other applications include condenser microphones, accelerometers, and the counting of objects. The sensing element itself is very adaptable to special applications since it can be made to any size or shape and from many material to satisfy particular requirements. Thus, the configuration of the sensing element and the shield element can be such as to permit their placement in locations with very small clearances as between the rotor and stator of a motor.

As will be evident to those skilled in the art, various modifications of this invention can be made or followed in the light of the foregoing disclosure without departing from the spirit or scope of the invention.

I claim:

1. A transducer for measuring the displacement of an electrically conductive object which comprises an uncharged sensing element formed of a conductive material and having a front surface shaped so that it can be positioned parallel to a surface of said electrically conductive object; a shield element formed of a conductive material and shaped so as to at least partially surround said sensing element, said sensing and shield elements being printed on a board of non-conductive material with said sensing element being circular in form and said shield element being arcuate in shape and spaced apart from said sensing element; a conductor positioned on said board between said sensing element and said shield element; an electrical lead connected between said conductor and ground; and a source of constant direct current voltage connected to said shield element.

2. A transducer for measuring the displacement of an electrically conductive object which comprises an elongated metal body member having a longitudinal opening formed therein and extending throughout its length; a first metal plate having a flat front surface, said plate being attached to one end of said body member; an insulating material disposed between said body member and said first metal plate; an opening formed in said first metal plate in alignment with said longitudinal opening formed in said body member; a second metal plate having a flat front surface, said second metal plate being positioned in and spaced apart from said opening formed in said first metal plate, and said flat surface of said second metal plate being in the same geometric plane as said flat surface of said first metal plate; a hollow insulator fixedly positioned in said opening in said body member, the end of said insulator adjacent said second plate member being closed with the opposite end of said insulator being open; a metal tube disposed in an opening in said closed end of said insulator, one end of said tube being attached to said second metal plate; a coaxial cable having a central conductor and an outer shield, one end of said cable being positioned in said insulator with its central conductor connected to said metal tube; a lead connecting said shield of said coaxial cable to said body; and a source of constant direct current voltage connected to said first metal plate.

3. A transducer according to claim 2 in which a voltage amplifier is connected to the central conductor of said coaxial cable at its end opposite to its connection to said metal tube.

* * * * *